United States Patent Office 3,458,464
Patented July 29, 1969

3,458,464
PRODUCTION OF MELAMINE-UREA-FORMALDE-
HYDE CONCENTRATES
Donald S. Shriver, Disputanta, Va., and Edward J. Bara, Syracuse, N.Y., assignors to Allied Chemical Corporation, New York, N.Y., a corporation of New York
No Drawing. Continuation of application Ser. No. 601,552, Dec. 14, 1966, which is a continuation-in-part of application Ser. No. 164,375, Jan. 4, 1962. This application Oct. 1, 1968, Ser. No. 764,310
Int. Cl. C08g 9/30
U.S. Cl. 260—29.4                8 Claims

ABSTRACT OF THE DISCLOSURE

Stable, aqueous solutions of a melamine-urea-formaldehyde reaction product are produced by: (A) adding sufficient melamine and urea to aqueous formaldehyde below 80° C. to provide a formaldehyde:amino group mol ratio in the range 2.5 to 5.0 and a melamine:urea mol ratio in the range 0.5 to 2.5 (B) adjusting the pH to 4.5 to 6.0 (C) heating the mixture at 60° to 80° C. for at least 15 minutes and (D) distilling water from the mixture at reduced pressure until the liquid residue contains 60% to 90% solids.

CROSS-REFERENCE TO RELATED APPLICATIONS

This application is a continuation of co-pending application Ser. No. 601,552 filed Dec. 14, 1966, now abandoned which in turn is a continuation-in-part of application Ser. No. 164,375 filed Jan. 4, 1962 now abandoned.

This invention relates to a process for the production of stable liquid non-resinous melamine-urea-formaldehyde concentrates containing a high percentage of formaldehyde and adapted particularly for use in the manufacture of synthetic resins.

Formaldehyde for use by aminoplastic resin manufacturers is generally shipped as an aqueous solution containing 37–50% by weight of formaldehyde. Thus, a large portion of the shipping charge is for transportation of water. Moreover, the aqueous solutions of formaldehyde have a tendency to polymerize during shipment and storage and must be kept heated or inhibited with methanol to avoid this difficulty. These factors all add to the cost of formaldehyde without compensating benefit to the resin manufacture.

Melamine-urea-formaldehyde resins are generally produced in equipment sized to contain the large percentage of water present in commercial formaldehyde solutions. A decrease in water content of the starting materials will thus permit higher production rates for a given size of equipment. Processing costs for evaporation of water would also be decreased and reaction rates may be favorably affected.

Activated by the utility and economic importance of such a product, many attempts have been made to produce a stable melamine-urea-formaldehyde concentrate, but without significant commercial success. For example, U.S. Patent 2,898,324 discloses a method of making a liquid, melamine-modified urea-formaldehyde resin that is particularly adapted for use as an industrial adhesive bonding agent. In contrast with the reaction products of the present invention, which are not resins but are essentially the chemical equivalents of urea, melamine and formaldehyde, as referred to hereinafter, the product described in this patented process is highly polymeric as evidenced by its incompatability with water. This incompatability with water limits use of the liquid as a substitute for urea, melamine, and aqueous formaldehyde in resin manufacturing.

In consideration of the problems and disadvantages inherent in the prior art methods for preparing melamine-urea-formaldehyde reaction products and in the products obtained thereby, it is an object of this invention to produce a stable concentrate of melamine, urea, and formaldehyde containing a high percentage of formaldehyde and a low percentage of water.

It is another object of the invention to provide an economical method of producing concentrates of melamine, urea, and formaldehyde from commercial formaldehyde solutions containing 37–50% by weight of formaldehyde.

Other objects and advantages of the present invention will become apparent from the description thereof that follows.

Generally, the invention resides in a process for the production of a stable, aqueous solution of a melamine-urea-formaldehyde reaction product, which comprises: (A) adding to an aqueous formaldehyde solution containing from 30% to 50% by weight formaldehyde, at a temperature below 80° C., melamine and urea in amount such that the mol ratio in the resulting mixture is in the range of 2.5–5.0 mols formaldehyde for every one mol —$NH_2$ group in the melamine and urea present, and the ratio of melamine to urea is in the range of 0.5–2.5 mols of melamine for each mol of urea; (B) adjusting the pH of the mixture to be in the range of 4.5–6.0; (C) heating the mixture at a temperature within the range of 60°–80° C.; and (D) distilling water from the mixture until the liquid residue contains 60% to 90% total solids.

In carrying out the process of the invention, a 30% to 50% aqueous formaldehyde solution is one of the starting materials. This may be a commercial methanol-inhibited solution or an uninhibited formaldehyde solution. Urea and melamine are added to the aqueous formaldehyde solution and dispersed in the aqueous solution at temperatures below 80° C.

The urea and melamine are added to the formaldehyde in manner and amount such that the mol ratio during mixing is never less than 2.5 mols formaldehyde for every one mole amino (—$NH_2$) group in the urea and melamine and the mol ratio of the final mixture is in the range 2.5 to 5.0 mols formaldehyde per mol amino group. Preferably the final mol ratio is in the range of 3.0–4.5 mols formaldehyde per mol of amino group. The ratio of melamine to urea in the mixture is limited to 0.5–2.5 mols of melamine for each mol of urea, preferably 1.0–2.0 mols of melamine per mol of urea.

It is significant that when the formaldehyde is added to the urea-melamine instead of vice versa, the process is hampered by solids formation, probably due to the high initial amino group:formaldehyde mol ratio.

The acidity of the reaction mixture is adjusted to a pH in the range of 4.5–6.0, preferably to a pH of 5.0–5.7. This may be accomplished by adjusting the acidity of the aqueous formaldehyde solution to bring the pH to a point such that after dispersion of the urea and melamine therein, the resulting reaction mixture will have the required acidity. Operating in this manner, any further adjustment in the pH of the reaction mixture may be made by addition of strong alkaline material or a strong acid to the reaction mixture as initially prepared. Instead of adjusting the pH of the formaldehyde, the amount of alkali or acid necessary to bring the pH of the reaction mixture to the required value may be added directly to the reaction mixture.

The reaction mixture thus prepared is heated at temperatures within the range of 60° to 80° C. for at least fifteen to thirty minutes. Following this preliminary reaction step, water is distilled from the mixture until the liquid residue of the evaporation contains 60% to 90%, preferably 80% to 90%, total solids. This solids content is calculated in terms of formaldehyde, melamine, and urea and is based on analysis of the distillation residue for carbon and nitrogen, assuming that the ratio of melamine to urea is not changed during the processing.

Heating of the reaction mixture during the evaporation step serves to further the reaction of the melamine, urea and formaldehyde. Accordingly, the time and temperature of the reaction and evaporation steps together function to carry the reaction to the desired degree. When a batch distillation is employed, a minimum reaction period of fifteen minutes at a temperature of about 80° C. followed by evaporation at about 75° C. over a minimum period of about thirty minutes provides suitable reaction conditions. Employing a film or "flash" evaporation procedure with its characteristic short period of exposure of the liquid to the heated evaporator surfaces, a minimum reaction period of about thirty minutes at about 80° C. provides suitable reaction conditions. The batch reaction and evaporation temperatures may be lowered to about 60° and to about 45° C., respectively, to achieve the desired results upon employment of longer heating periods, which may also be dependent upon the reduced pressure conditions employed, as will appear hereinafter. Similarly, the "flash" evaporation may be accomplished at 60° with concomitant increase of reaction time or compensating reduction of reaction pressure conditions. The foregoing represents the minimum conditions for time and temperature of heating the melamine-urea-formaldehyde solution during the reaction and evaporation steps in carrying out the process.

There is a maximum limit to the time during which the aqueous solution of a melamine, urea and formaldehyde may be heated. When the solution is heated in the reaction step and later during the evaporation of the reaction mixture to concentrate it, the total time of heating is limited to a maximum no greater than about four hours when the minimum temperature conditions stated above are employed and preferably no greater than about two hours when the maximum temperature conditions are used.

The evaporation of the aqueous melamine-urea-formaldehyde reaction mixture is carried out at temperatures of about 45° to 75° C. and under pressures below atmospheric such that the water is vaporized at those temperatures. In general, this entails evaporating the water under pressures no higher than 70 mm. of Hg (absolute) pressure. The evaporation of the water is preferably carried out at 45° to 60° C. under reduced pressures of 50 to 65 mm. of Hg.

The evaporation is carried out by simple batch distillation or continuous evaporation such as flash distillation until the liquid residue of the evaporation contains 60% to 90%, preferably 80% to 90%, total solids, (calculated in terms of formaldehyde, melamine, and urea based on analysis of the residue for carbon and nitrogen). Loss of formaledhyde with the water taken overhead during this evaporation is limited to obtain a residue containing 2.3 to 4.5, preferably 2.5 to 4.0, mols of formaldehyde per mol of amino ($-NH_2$) group in the urea and melamine. This is accomplished by distilling the required quantity of water from the reaction mixture at a rapid rate, such that at least about 0.5% of the charge is vaporized and taken off as distillate per minute.

In heating a reaction mixture of melamine, urea, and formaldehyde, the pH of the mixture usually decreases. Under some conditions suitable for preparing the product of this invention, the final acidity of the product may become so high that the product on standing does not remain a clear solution. The product of this invention should have an acidity corresponding to a pH of at least 5. Accordingly, when for any reason the pH of the reaction mixture falls below 5, before storing or shipping the product, its acidity is adjusted to a pH value of at least 5 or higher, preferably to pH 8–9, by addition of base. We have discovered that a particularly stable product results if the pH value is adjusted to pH 8–9.

The stable, liquid products obtained by the process may be stored or shipped without throwing down solids interfering with their handing or use. In referring to such solutions as stable, it is meant solutions which when kept at room temperatures (of the order of 25°–30° C.) remain clear liquids for a period of at least one month. In general, the products of the invention remain clear liquids for periods of at least two months. Adjustment of the reaction mixture to proper acidity, before reaction of the melamine, urea, and formaldehyde takes place to a substantial degree, is particularly important to ensure stability of the product.

The following examples illustrate the invention:

Example 1

A 37% aqueous formaldehyde solution containing about 7% methanol was adjusted to pH 3.4. This pH was sufficiently acidic to provide the desired adjustment in pH of the reaction mixture obtained with the particular commercial urea and melamine used in carrying out this example. The acidic aqueous formaldehyde solution was warmed to about 75° C. Into 892 grams of the solution were added 20 grams of urea and 84 grams of melamine to dissolve the urea and melamine. The formaldehyde to amino group ($-NH_2$) mol ratio was about 4.1 to 1, and the melamine to urea mol ratio was 2 to 1. The reaction mixture, having a pH of about 5.4, was heated at 70° C.–75° C. for thirty minutes and evaporated to about 55 mm. of Hg pressure in a tubular film evaporator through which the liquid passed over the heat transfer surfaces in less than ten seconds to evaporate and take off as overhead distillate vapors about 52% by weight of the charge to the evaporator. Under these conditions, the temperature of the reaction mixture being evaporated was 50°–55° C.

The product drawn from the film evaporator was a clear, aqueous solution of melamine-urea-formaldehyde reaction product having a pH of 4.6 and containing 87.7% by weight total solids and analyzing about 3.9 to 1 mol ratio of formaldehyde to amino group in the melamine and urea. The pH of the concentrated solution was adjusted to 8.4 by addition of about 0.5 ml. of 50 wt. percent aqueous sodium hydroxide solution. The resulting water-soluble product was stable for storage period of over two months at room temperature. A sample of product adjusted at pH 5.4 was stable for one month. The overhead vapors contained only about 3% formaldehyde.

By dissolving in the liquid product of this example, urea and melamine in amount sufficient to reduce the formaldehyde-amino group ratio to, for example, 0.8–1.0 mol of formaldehyde for each amino group, a reaction mixture may be prepared that may be treated in manners similar to those known to the art to produce adhesives, molding powders, and fabric-treating resins.

Example 2

The procedure of Example 1 was modified to provide a formaldehyde to amino group mol ratio of 3.2 to 1, and a melamine to urea mol ratio of 1 to 1. Reaction pH was 5.4. After an initial reaction period of thirty minutes at 70°–75° C., the reaction mixture was concentrated as in Example 1 under 50 mm. Hg pressure until the residue of the distillation contained 85.9% by weight total solids. The concentrate thus prepared had a pH of 4.9 and was adjusted with 50% aqueous NaOH to pH 8.6. The resulting water-soluble product contained about 2.5 mols formaldehyde per mol of amino group and remained a clear liquid when stored over a period of two months at room temperature.

Example 3

Illustrative of the effect of reaction acidity, the procedure of Example 2 was modified to show results from use of reaction acidities relatively close to reaction pH 5.4 of Example 2, i.e., the effect of reaction acidities of pH 4.7 and pH 6.4. In these comparative tests, the other reaction conditions, including adjustment of pH of final product, were substantially the same as in Example 2. Unexpectedly, a major change in the stability of the final product was noted. Whereas the product of Example 2 was stable over a period of two months, product prepared at a reaction pH of 4.7 was stable for about one month and product prepared at a reaction pH of 6.4 was stable for only five days.

It is characteristic of the liquid products of this process that they may be stored and shipped at atmospheric temperatures without throwing down insoluble material which would interfere with handling or use of the products. These liquid products contain the formaldehyde, melamine, and urea in a form in which at least a part of the formaldehyde is chemically combined with the urea and melamine, but is combined in such manner that the materials are readily converted into resinous products of the nature of the adhesives or molding powders having properties demanded by the trade, and obtained by procedures similar to those now known for making formaldehyde-melamine-urea resins starting with the separate constituents, e.g., starting with aqueous solutions of formaldehyde and solid urea and melamine.

It is another important characteristic of the concentrates obtained by the process of the invention that said concentrates do not require stabilizers to prevent gelation or solidification. The term "stabilizer" refers to known additives such as methanol or ethylamine, ordinarily used in the art to stabilize melamine-urea-formaldehyde solutions. The inclusion of such stabilizers increases the cost of the solutions without compensating benefit to the user.

The invention further provides a practical process for the conversion of formaldehyde, urea, and melamine into a stable liquid product containing 60% or more, preferably 80% to 90%, total solids calculated as formaldehyde, urea and melamine and the remainder water in which this solids content is water-soluble at atmospheric temperatures. These products are mobile fluids at room temperatures which may be readily pumped or readily flow by gravity from one container into another. They are true solutions and may be made more fluid by adding water.

Furthermore, these stable solutions are particularly useful because of their high concentration of solids, which are not resins but are essentially the chemical equivalents of urea, melamine, and formaldehyde with respect to formation of resins. For example, it is well known to produce hard, insoluble resins by heating an aqueous, acidic solution of melamine, urea, and formaldehyde in a mole ratio of 1:3:9. Similar resins may be prepared by diluting with water the products of this invention, if necessary, to obtain a solution of the desired concentration, adding urea and melamine to bring the melamine-urea-formaldehyde ratio to 1:3:9, and after adding acid to adjust the pH to the desired point, treating the solution in the same general way as solutions of melamine, urea and formaldehyde heretofore have been treated to form the desired resins therefrom.

What is claimed is:

1. A process for the production of a stable, aqueous solution of a non-resinous melamine-urea-formaldehyde reaction product, which comprises: (A) adding to an aqueous formaldehyde solution containing from 30% to 50% by weight formaldehyde, at a temperature below 80° C., melamine and urea in amount such that the mol ratio in the resulting mixture is in the range of 2.5–5.0 mols formaldehyde for every one mol —NH$_2$ group in the melamine and urea present, and the ratio of melamine to urea is in the range of 0.5–2.5 mols of melamine for each mol of urea and the pH of the mixture is in the range of 4.5–5.7, (B) heating the mixture at a temperature within the range of 60–80° C., (C) thereafter, distilling water from the mixture until the liquid residue contains 60% to 90% total solids, and keeping the total heating time within the maximum limit which maintains the character of the reaction products as true aqueous solutions, and (D) afterafter, adjusting the pH of the resulting aqueous solution to the range of 8–9.

2. A process as claimed in claim 1, wherein the pH of the aqueous formaldehyde of (A) is adjusted prior to incorporation of the melamine and urea to assure that the pH of the mixture thereof is within said range of 4.5–5.7.

3. A process as claimed in claim 1, wherein the resulting liquid residue of (D) is admixed with a substance of the group consisting of urea and melamine.

4. A process as claimed in claim 3, wherein the substance is admixed in amount whereby the formaldehyde-amino group ratio is reduced from 0.8–1.0 mol of formaldehyde for each amino group.

5. A process as claimed in claim 1, wherein in step (A), the formaldehyde amino group mol ratio is in the range of 3.0 to 4.5, the melamine:urea mol ratio is in the range 1.0 to 2.0 and the pH is in the range 5.0 to 5.7.

6. A process as claimed in claim 5, wherein in (C), the distilling of water from the mixture occurs at a temperature of from 45° to 75° C. maintained for at least about 30 minutes and no longer than about 4 hours.

7. A process as claimed in claim 5, wherein in (B) and in (C), the heating of the mixture occurs for about 30 minutes and this distilling of water therefrom occurs by continuously passing the mixture as a film in contact with heating surfaces at a temperature of from 60° to 80° C. for no longer than about 10 seconds.

8. A process as claimed in claim 5, wherein in (C), the distilling of water from the mixture occurs under a reduced pressure no higher than 70 mm. of Hg.

References Cited

UNITED STATES PATENTS

| | | | |
|---|---|---|---|
| 2,797,206 | 6/1957 | Suen et al. | 260—67.6 |
| 2,898,324 | 8/1959 | Mackay | 260—67.6 |
| 2,947,750 | 8/1960 | Gerg | 260—249.6 |

WILLIAM H. SHORT, Primary Examiner

HOWARD SCHAIN, Assistant Examiner

U.S. Cl. X.R.

260—67.6